United States Patent
Midoriya et al.

(10) Patent No.: US 10,046,513 B2
(45) Date of Patent: Aug. 14, 2018

(54) SPIN WELD PART AND SPIN WELDING METHOD

(71) Applicants: TAKEHIRO CO., LTD., Anjo, Achi (JP); Takehiro Kyushu Co., Ltd., Yame, Fukuoka (JP)

(72) Inventors: Noriyasu Midoriya, Aichi (JP); Yuuki Saito, Fukuoka (JP)

(73) Assignees: TAKEHIRO CO., LTD., Anjo, Aichi (JP); TAKEHIRO KYUSHU CO., LTD., Yame, Fukuoka (JP)

( * ) Notice: Subject to any disclaimer, the term of this patent is extended or adjusted under 35 U.S.C. 154(b) by 300 days.

(21) Appl. No.: 14/991,067

(22) Filed: Jan. 8, 2016

(65) Prior Publication Data

US 2017/0197357 A1  Jul. 13, 2017

(51) Int. Cl.
  B32B 37/00 (2006.01)
  B29C 65/06 (2006.01)
  B29C 65/48 (2006.01)
  B29L 31/30 (2006.01)

(52) U.S. Cl.
  CPC .......... B29C 65/0672 (2013.01); B29C 65/48 (2013.01); *B29L 2031/3055* (2013.01)

(58) Field of Classification Search
  CPC ...... B29C 65/06; B29C 65/0672; B29C 65/48

USPC .......................................................... 156/73.5
See application file for complete search history.

(56) References Cited

U.S. PATENT DOCUMENTS 4,477,307 A * 10/1984 Cearlock ............ B29C 65/0672
                                                    156/359
4,636,124 A *  1/1987 Gugle ................ B29C 65/0672
                                                    156/73.5

FOREIGN PATENT DOCUMENTS

JP      64-52729 U    3/1989
JP      3-203628 A    9/1991
JP      4-26297 B2    5/1992

* cited by examiner

*Primary Examiner* — James D Sells
(74) *Attorney, Agent, or Firm* — Matthias Scholl, PC; Matthias Scholl

(57) ABSTRACT

An object is to provide a spin welding component that has a simple configuration of a welding surface and provides enhanced welding strength. A spin welding component 1 includes a shaft portion 2 formed in an approximately columnar shape, a flange portion 3 extended outward from below the shaft portion 2 to be formed in a disk-like shape, and an opening 4 formed by opening part of a bottom face of the flange portion 3. A molten resin 9 as molten material is applied on the bottom face. High-speed rotation causes the molten resin 9 to be melted by the frictional heat, and part of the molten resin 9 enters the opening 4 to be welded.

16 Claims, 9 Drawing Sheets

SPIN WELD PART AND SPIN WELDING METHOD

TECHNICAL FIELD

The present invention relates to a welding component as a mounting member used for spin welding that melts and bonds a welding material by the frictional heat caused by rotation.

BACKGROUND ART

Patent Literature 1 has been known as the prior art with regard to spin welding. This aims to reduce a so-called "through transfer phenomenon" that causes a bent or wrinkle on a mounting substrate 6 in the process of fixing a fixture 2 to the mounting substrate 6 by rotational welding. In a rotational welding resin member of Patent literature 1 having a columnar portion and a disk-shaped flange portion integrally provided at one end of the columnar portion, the wall thickness of the flange portion is gradually decreased from the center toward the outer circumference.

CITATION LIST

Patent Literature

PTL 1: JP H04-026297B

SUMMARY

Technical Problem

There is, however, still a room for improvement with regard to the technique of enhancing the strength of spin welding or more specifically with regard to good balance between the manufacturing cost of a welding component and the welding strength. For example, when a mounting bracket is spin-welded to a base member, the molten material is concentrated in the center, so that the mounting bracket rises from the base member. This causes the problems of failing to provide the sufficient welding strength, the good appearance and the high dimensional accuracy (as shown in FIG. 3).

An object of the invention is thus to provide a spin welding component that has a simple configuration of a welding surface and provides enhanced welding strength, good appearance and high dimensional accuracy.

Solution to Problem

By taking into account the above object, according to one aspect of the invention, there is provided a spin welding component comprising a main body including a resin; and an opening in a concave shape provided at center of a bottom of the main body. It is preferable that the main body has a flange portion integrally provided with a shaft portion and that the opening is formed on the shaft portion. The opening preferably has a circular bottom face.

The volume of the opening is preferably set according to the amount of the molten resin of at least the spin welding component. This ratio may differ, for example, according to the material of the spin welding component. It is preferable that the ratio of the amount of molten resin to the volume of opening is basically 1 to 1. The ratio of amount of molten resin:volume of the opening may be 1:0.7 to 1.3. It is generally preferable that the volume of the opening is greater than the amount of the molten resin. The less volume of the opening, on the contrary, enables the molten resin to be pressed downward by the spin welding component. For example, when the volume of the opening is 0.8 relative to the amount of molten resin=1, a cover may be placed over the molten resin to apply a pressure. This ensures favorable bonding. The bonding strength may be increased to 1.4 to 1.6 times. This configuration prevents a pressure of more than necessity from being applied between the spin welding component and the base member. This accordingly suppresses deterioration of the appearance by the molten resin or by deformation of the spin welding component and the base member and ensures the dimensional accuracy.

It is preferable that the bottom face of the spin welding component is welded to the base member via the resin molten by spinning. When the spin welding component and the base member are made of the same material, the material may be melted. When the spin welding component and the base member are made of different materials, these materials may be tangled or dissolved. A welding resin material of the same material or a different material may be provided on the bottom face of the main body.

According to another aspect of the invention, there is provided a spin welding method comprising: rotating the spin welding component of the above aspect that is placed on a base member to be in close contact with the base member; melting the spin welding component by frictional heat between the base member and the spin welding component caused by the rotating; causing molten resin to be concentrated in a center and flow into the opening by the rotating such that the spin welding component presses the molten resin downward; and solidifying the molten resin flowing into the opening to weld the spin welding component with the base member.

The material of the spin welding component and the material of the base member may be selected adequately. For example, the material of the spin welding component may be polyester, polyethylene or polypropylene, and the material of the base member may be kenaf and/or 50% glass and 50% polypropylene.

In the spin welding component of the above aspect, the opening may be formed in a reverse concave sectional shape having an inner ceiling. The molten resin may be solidified in the state that the molten resin is in contact with the inner ceiling or in the state that the molten resin is not in contact with the inner ceiling.

The bottom preferably has an approximately circular shape, since this is suitable for spin welding. This is, however, not essential.

In the bottom of the spin welding component of the above aspect, the opening denotes a cavity in a reverse concave sectional shape having an open bottom face. An inner ceiling may be formed in an upper portion of the cavity or may not be formed. The opening is formed in, for example, a circular shape, but may be formed in another shape such as a rectangular shape or a hexagonal shape.

The shaft portion and the flange portion of the main body may be formed integrally or may be formed separately and subsequently integrated.

Advantageous Effects of Invention

The spin welding component according to the above aspect of the invention has enhanced welding strength. The configuration of the spin welding component prevents a pressure of more than necessity from being applied between the spin welding component and a welded member such as a base member. This accordingly suppresses deformation of the spin welding component and the base member by the molten resin and ensures the good appearance in the mounted state and the improved dimensional accuracy.

DESCRIPTION OF EMBODIMENTS

A spin welding component 1 according to Embodiment 1 of the invention is described with reference to FIGS. 1 and 2. The spin welding component 1 includes has a main body including a shaft portion 2 formed in an approximately columnar shape and a flange portion 3 extended outward from below the shaft portion 2 to be formed in a disk-like shape as shown in FIGS. 1(a) to 1(c). The spin welding component 1 also includes an opening 4 formed by opening the entirety or part of a bottom face of the shaft portion 2.

Figure 1A:
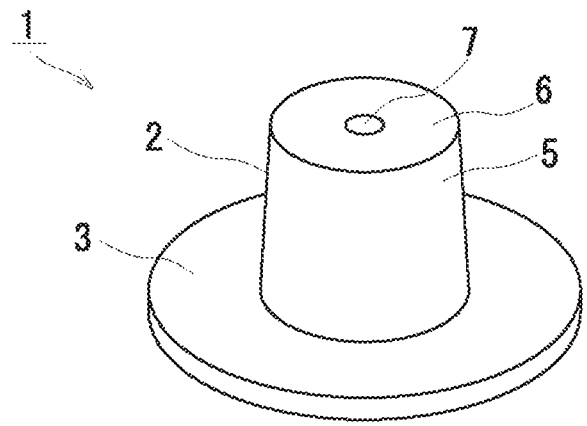
FIG. 1(a) is a downward perspective view illustrating a spin welding component 1 according to Embodiment 1 of the invention.
Figure 1B:
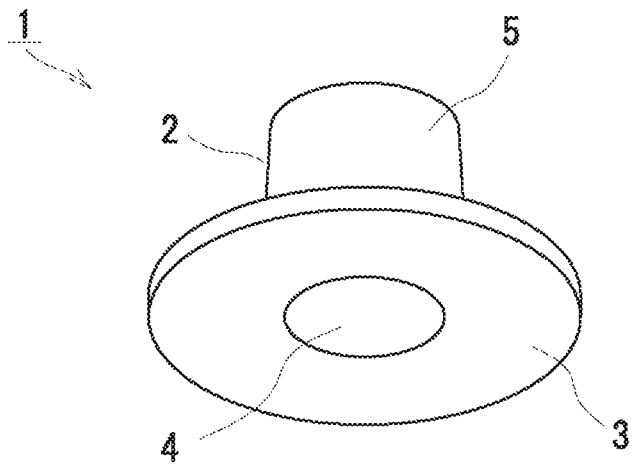
FIG. 1(b) is an upward perspective view illustrating the spin welding component 1 of Embodiment 1.
Figure 1C:
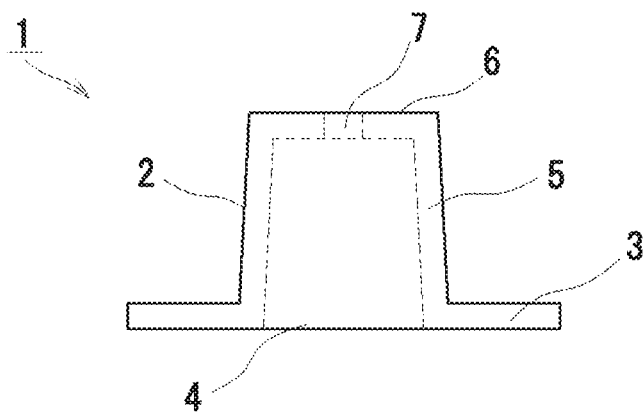
FIG. 1(c) is a front view illustrating the spin welding component 1 of Embodiment 1, wherein molten resin 9 is omitted from the illustration.
Figure 2:
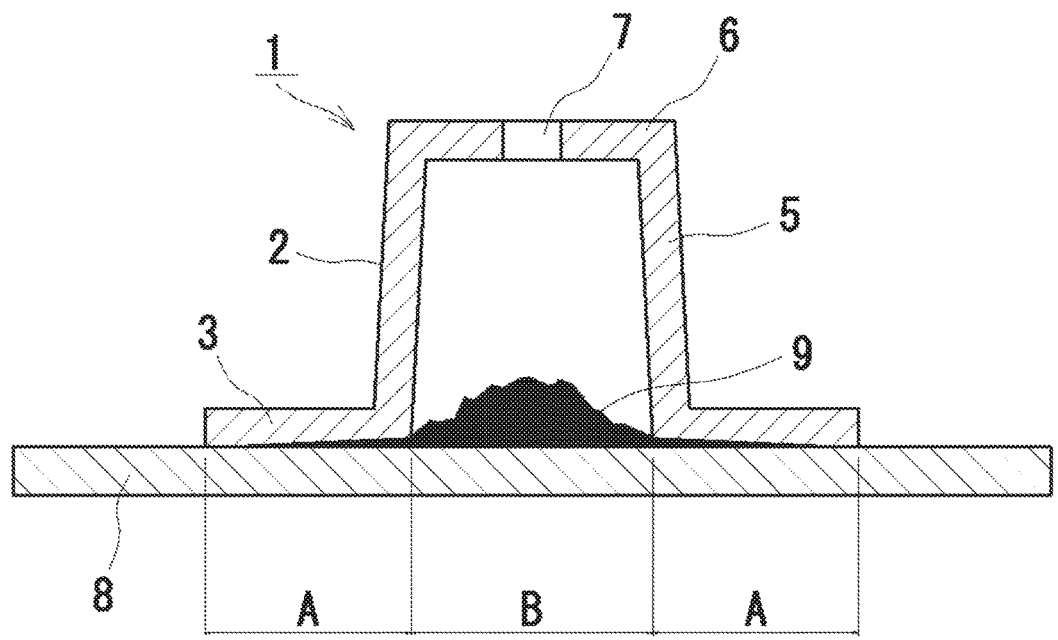
FIG. 2 is a schematic sectional view illustrating the state that the spin welding component 1 of Embodiment 1 is welded to a base member 8.

The configuration of the spin welding component 1 is described more specifically with reference to FIGS. 1(a) to 1(c). The spin welding component 1 is a plastic molded part produced by integrally molding the shaft portion 2 and the flange portion 3. The shaft portion 2 is formed in a cap-like shape including a cylindrical body 5 in an approximately cylindrical shape and an upper plate 6 integrally provided on the cylindrical body 5. The flange portion 3 is a ring-shaped plate member that is extended radially outward from the circumference of a lower end of the shaft portion 2 as the base. The opening 4 is formed at the center of a bottom of the cylindrical body 5 to define an inner cavity of the shaft portion 2 and is recessed upward from a bottom face of the spin welding component 1. The bottom of the cylindrical body 5 is connected with the inner circumference of the flange portion 3, and the cylindrical body 5 is extended upward from the flange portion 3. The cylindrical body 5 has diameter expanded downward but may have a fixed diameter. The upper plate 6 has an upper hole 7 formed in its center. This is, however, not essential but is an example of the product configuration, and the upper hole 7 may be omitted. The spin welding component 1 may have an optional configuration suitable for spin welding or an optional configuration required according to the specification of a final product.

Available examples of the material used for the spin welding component 1 include thermoplastic resins such as polyester, polyethylene, polypropylene, polystyrene, polyvinyl chloride, acrylic resin, acrylonitrile-butadiene-styrene resin, polyethylene terephthalate, nylon, polyamide, polycarbonate and polyacetal, thermosetting resins such as phenolic resin, epoxy resin and melamine resin and composite materials such as glass fiber-reinforced plastic and carbon fiber-reinforced plastic.

Available examples of the material for a welded member to which the spin welding component 1 is mounted include thermoplastic resins such as polyester, polyethylene, polypropylene, polystyrene, polyvinyl chloride, acrylic resin, acrylonitrile-butadiene-styrene resin, polyethylene terephthalate, nylon, polyamide, polycarbonate and polyacetal and composite materials of these thermoplastic resins with glass fiber, carbon fiber or kenaf.

According to this embodiment, the spin welding component 1 is made of polypropylene. The flange portion 3 has a diameter of 40 mmϕ, and the opening 4 has a diameter of 22 mmϕ. A base member 8 as the welded member is a plate-like member made of a composite material consisting of 50% kenaf and 50% polypropylene.

The following describes a method of welding the spin welding component 1. The spin welding component 1 is fastened above the base member 8 as the welded member via a jig (not shown) in a spin welding machine (not shown). As shown in FIG. 2(a), on completion of setting the respective component and member, the spin welding component 1 is moved downward while rotating at high speed by the spin welding machine (not shown). The spin welding component 1 comes into contact with the base member 8 and is subsequently kept in close contact with the base material 8 under application of a downward load. When the spin welding component 1 rotates at high speed at a fixed point, the spin welding component 1 and the base material 8 are melted by the frictional heat. The molten resin is flowed toward the center of the opening 4 by the rotation and is solidified to weld the spin welding component 1 to the base member 8 as shown in FIG. 2(b). The spin welding component 1 may be used for automobile interior parts and may also be favorably used for small parts such as various brackets.

The following describes the functions and advantageous effects of the spin welding component 1. In the mounted state of the spin welding component 1 shown in FIG. 2(b), the spin welding component 1 is welded to the base material 8 in areas A on the lower face of the flange 3. This is compared with a conventional spin welding component 11 without the opening 4 with reference to FIGS. 3(a) and 3(b).

Figure 3:
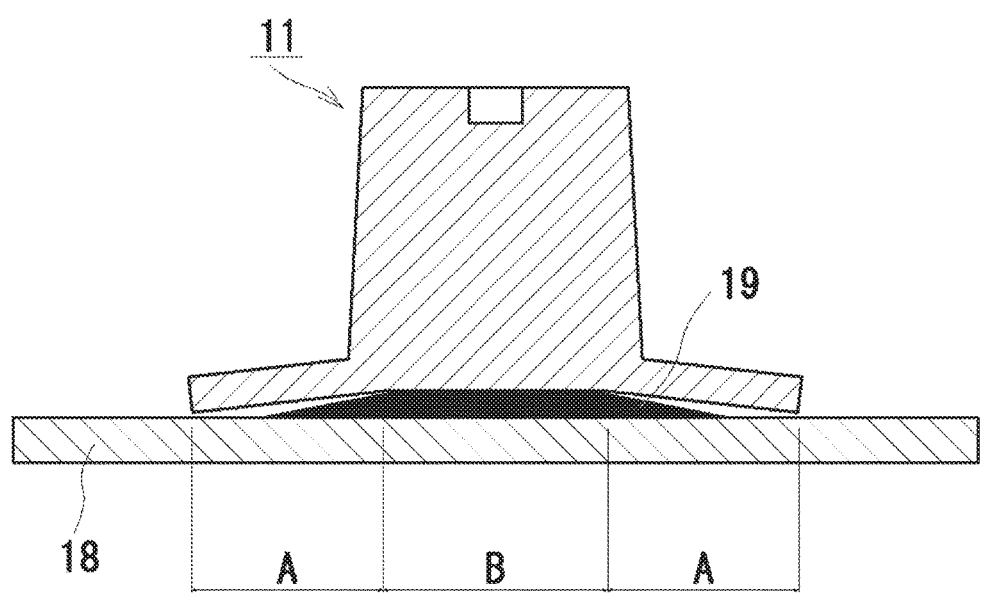
FIG. 3 is a schematic sectional view illustrating the state that a conventional spin welding component 11 is welded to a base member 18.

The conventional spin welding component 11 has the similar configuration and the similar dimensions except the opening 4 and is made of the similar material. Spin welding of this conventional spin welding component 11 causes a molten resin 19 concentrated at the center to be solidified as shown in FIG. 3.

The principle of solidifying the molten resin 19 concentrated at the center has not been elucidated. The results of a considerable number of experiments under the above conditions, however, indicate this phenomenon. Solidification of the molten resin 19 concentrated at the center causes the spin welding component 11 to be welded only in an area B but not in areas A. The spin welding component 11 accordingly rises from the base member 18. This causes a variation in mounting accuracy and a variation in welding strength and reduces the welding strength. This also causes deterioration of the appearance.

In the case of the spin welding component 1 according to Embodiment 1 of the invention, on the other hand, the molten resin that is melted during spin welding is partly flowed into the opening 4, so that the spin welding component 1 is welded in the areas A, i.e., in the entre bottom face of the flange portion 3. This provides the higher welding strength than the conventional spin welding component. This also suppresses a rise of the member in the welded state and stably provides the desired mounting accuracy and the desired welding strength.

Figure 4A:
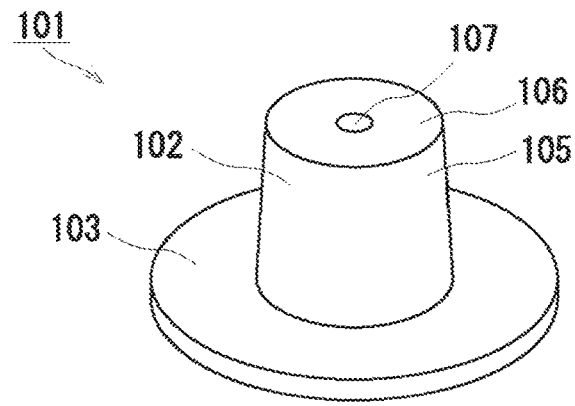
FIG. 4(a) is a downward perspective view illustrating a spin welding component 101 according to Embodiment 2 of the invention.
Figure 4B:
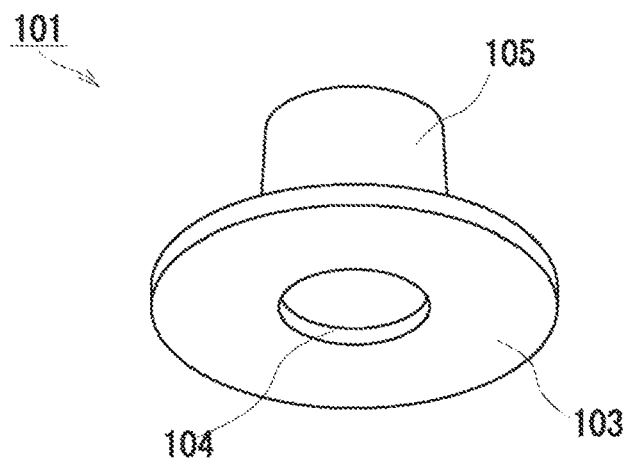
FIG. 4(b) is an upward perspective view illustrating the spin welding component 101 of Embodiment 2.
Figure 4C:
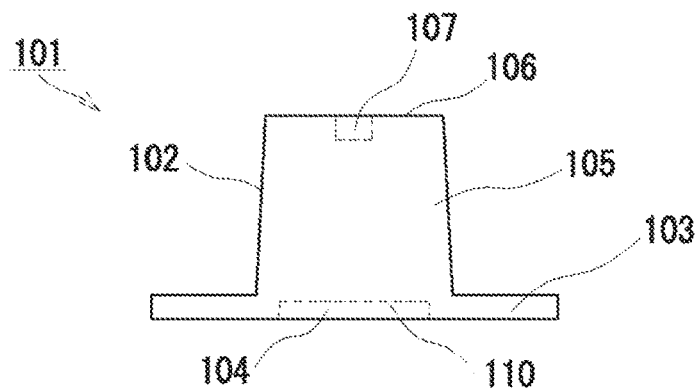
FIG. 4(c) is a front view illustrating the spin welding component 101 of Embodiment 2, wherein molten resin 109 is omitted from the illustration.
Figure 5A:
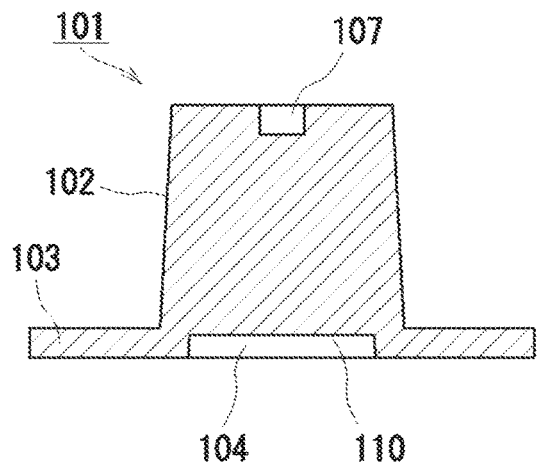
FIGS. 5(a), 5(b) and 5(c) are diagrams illustrating modifications of the spin welding component 101 of Embodiment 2.
Figure 5B:
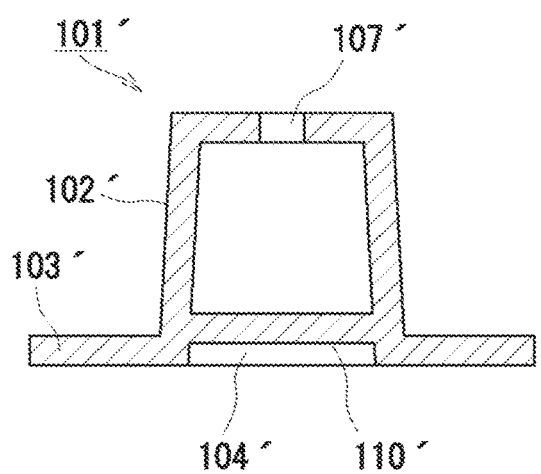
Figure 5C:
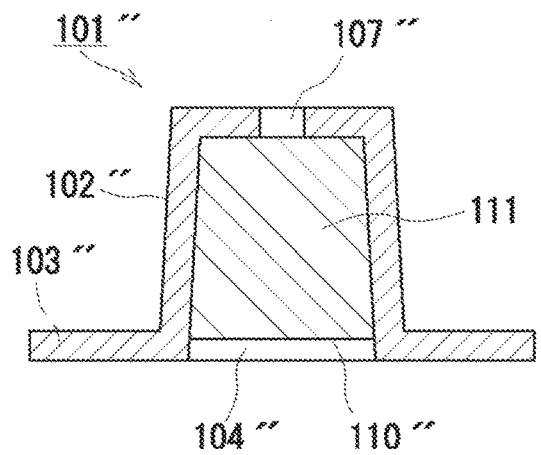
Figure 6:
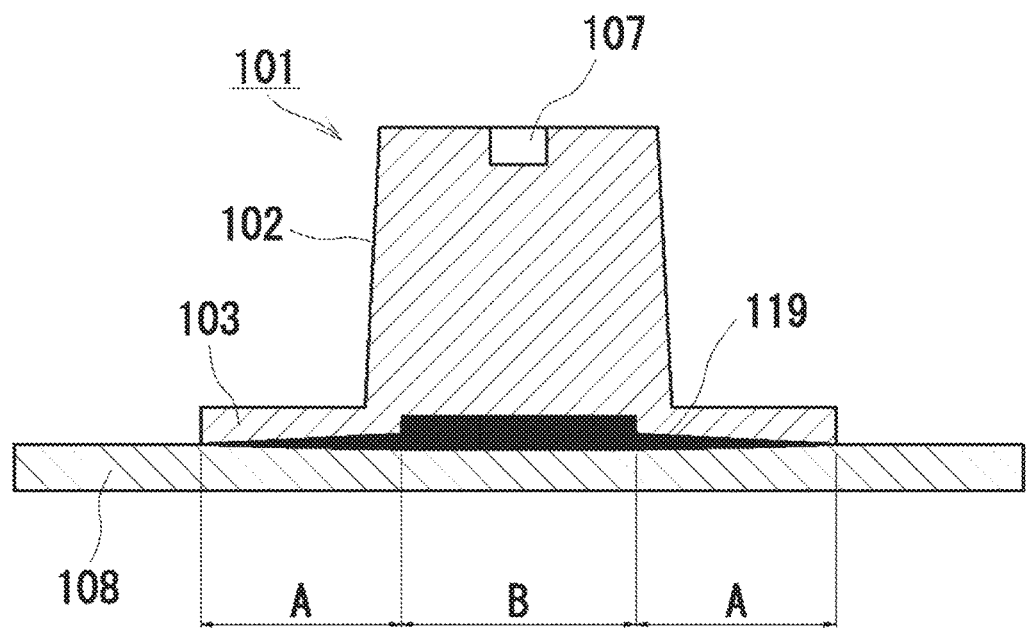
FIG. 6 is a schematic sectional view illustrating the state that the spin welding component 101 of Embodiment 2 is welded to a base member 108.

A spin welding component 101 according to Embodiment 2 of the invention is described with reference to FIGS. 4 to 6. The like components to those of Embodiment 1 are expressed by the like numerals to those of Embodiment 1 in their 100s and are not specifically described. As shown in FIGS. 4(a) to 4(c), like the spin welding component 1, the spin welding component 101 includes a shaft portion 102 formed in an approximately columnar shape, a flange portion 103 extended outward from below the shaft portion 102 to be formed in a disk-like shape, and an opening 104 formed by opening part of a bottom face of the flange portion 103. The opening 104 is formed in a reverse concave sectional shape having a less opening height than that of the spin welding component 1 and has an inner ceiling 110.

The opening 104 of Embodiment 2 has the inner ceiling 110 provided to close the upper portion inside of the shaft portion 102 and is accordingly formed as a cavity in an approximately short cylindrical shape having the reverse concave sectional shape. Some examples of providing the inner ceiling 110 are shown in FIG. 5. FIG. 5(a) illustrates the inner ceiling 110 that is an inner configuration formed by integrally filling the cavity other than the opening 104 to be solid with molding the spin welding component 101. FIG. 5(b) illustrates an inner ceiling 110' provided to part the cavity in a shaft portion 102'. FIG. 5(c) illustrates a configuration obtained by filling the cavity of a shaft portion 102" in a spin welding component having the similar configuration to that of the spin welding component 1 of Embodiment 1 with a filling member 111. The filling member 111 may be made of the same material as or may be made of a different material from the material of the spin welding component 1. For example, the material may be a fiber composite material or a porous material to provide the welding strength with the molten resin.

The spin welding component 101 is set in a spin welding machine (not shown) (shown in FIG. 6(a)) and is spin-welded to a base member 108 (shown in FIG. 6(b)), like Embodiment 1.

The following describes the functions and advantageous effects of the spin welding component 101. In the mounted state of the spin welding component 101 shown in FIG. 6(b), molten resin 109 concentrated in the opening 104 like Embodiment 1 is trapped by the inner ceiling 110 and is solidified in the state that the molten resin 109 is in contact with the inner ceiling 110. The spin welding component 101 is accordingly welded in an area B as well as in areas A like Embodiment 1.

This welds the entire bottom face of the spin welding component 101 and thereby provides the stronger welding than Embodiment 1. Welding the entire bottom face reduces a variation in welding strength of an actual product relative to a designed strength. There is accordingly no need to apply a load of more than necessity for spin welding. This suppresses deformation and damaged appearance of the spin welding component 101 and the base member 108 and readily ensures the dimensional accuracy.

With regard to the spin welding component 101, it is preferable to use the same type of thermoplastic resin or thermoplastic resin-containing composite material for the shaft portion 102, the flange portion 103, the molten resin 109 and the base member 108. Even when different materials are used, the molten resin 109 comes in close contact with the shaft portion 102, the flange portion 103 and the base member 108. This enhances the strength.

Figure 7A:
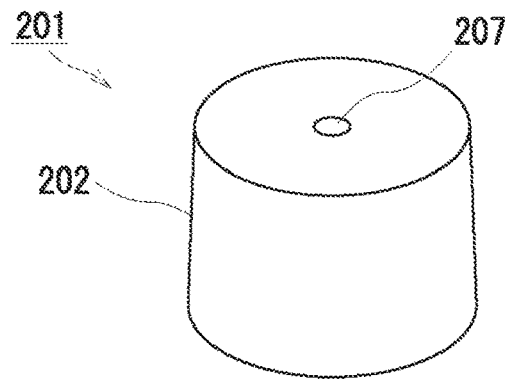
FIG. 7(a) is a downward perspective view illustrating a spin welding component 201 according to Embodiment 3 of the invention.
Figure 7B:
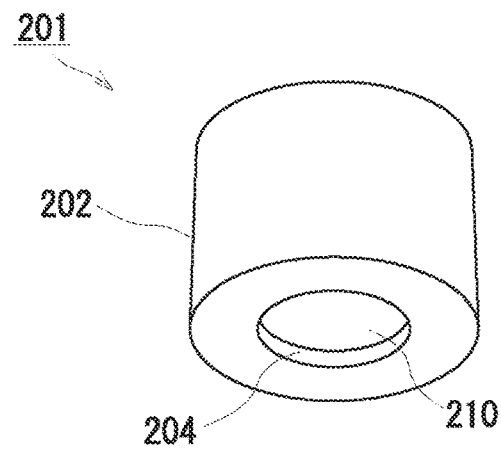
FIG. 7(b) is an upward perspective view illustrating the spin welding component 201 of Embodiment 3.
Figure 7C:
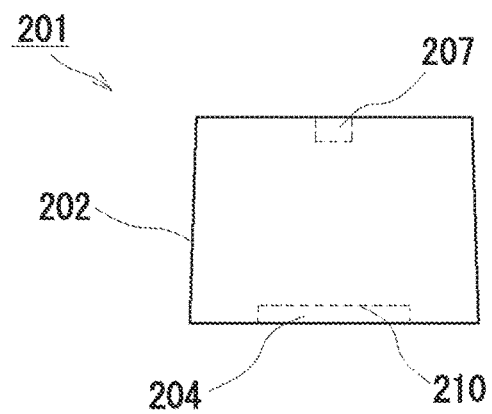
FIG. 7(c) is a front view illustrating the spin welding component 201 of Embodiment 3, wherein molten resin 209 is omitted from the illustration.

A spin molding component 201 according to Embodiment 3 of the invention is described with reference to FIG. 7. The like components to those of Embodiment 2 are not specifically described. As shown in FIGS. 7(a) to 7(c), the spin molding component 201 is formed in an approximately cylindrical shape as a whole without a flange portion and includes an opening 204 formed on its bottom face in a reverse concave sectional shape with an inner ceiling 210. The spin welding component 201 of Embodiment 3 has the similar functions and advantageous effects to those of Embodiment 2.

Figure 8A:
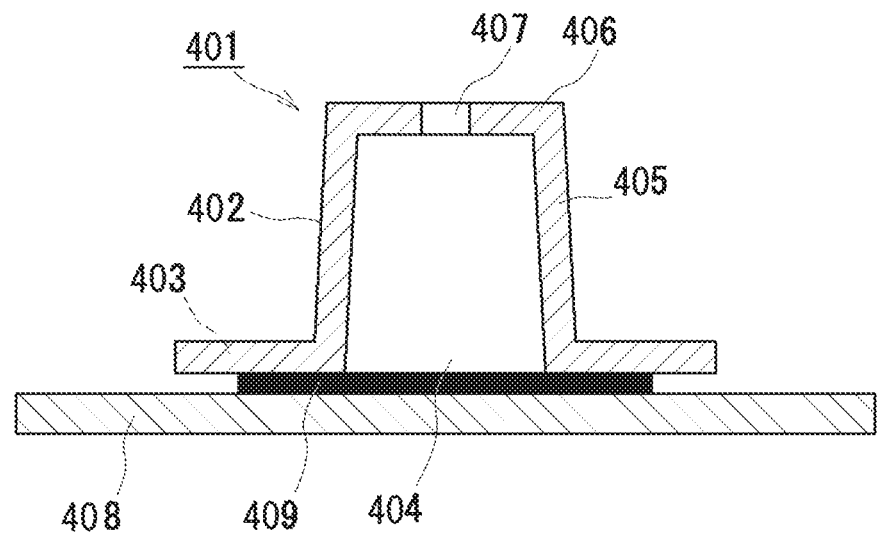
FIG. 8(a) is a schematic sectional view illustrating the state that a spin welding component 301 according to Embodiment 4 is mounted on a base member 308.

A spin molding component 401 according to Embodiment 4 of the invention is described with reference to FIG. 8(a). The like components to those of Embodiments 1 to 3 are not specifically described. As shown in FIG. 8(a), the spin welding component 401 has a welding resin film 409 in a circular shape applied between a shaft portion 402 and a bottom face of a flange portion 403. The welding resin 409 may be applied to cover an opening 404 or may be applied not to cover the opening 404. The welding resin 409 as the molten material is applied in advance on the bottom face of the spin welding component 1, prior to spin welding. The spin welding component 401 of Embodiment 4 has the similar functions and advantageous effects to those of Embodiments 1 to 3.

It is preferable to use the same type of thermoplastic resin or thermoplastic resin-containing composite material as that of the spin welding component 401 for the welding resin 409 as the molten material. This is, however, not essential and another material may be used. According to this embodiment, the welding resin 409 is made of a composite material consisting of 50% kenaf and 50% polypropylene like a base member 408 and is applied on the bottom face of the spin welding component 401.

The following describes a method of welding the spin welding component 401. The spin welding component 401 is fastened above the base member 408 as the welded member via a jig (not shown) in a spin welding machine (not shown). As shown in FIG. 2(a), on completion of setting the respective component and member, the spin welded component 1 is moved downward while rotating at high speed by the spin welding machine (not shown). The spin welding component 401 comes into contact with the base member 408 and is subsequently kept in close contact with the base material 408 under application of a downward load. When the spin welding component 401 rotates at high speed at a fixed point, the welding resin 9 is melted by the frictional heat. The melted welding resin 409 is flowed into the opening 404 by the rotation and is solidified to weld the spin welding component 401 with the base member 408.

Figure 8B:
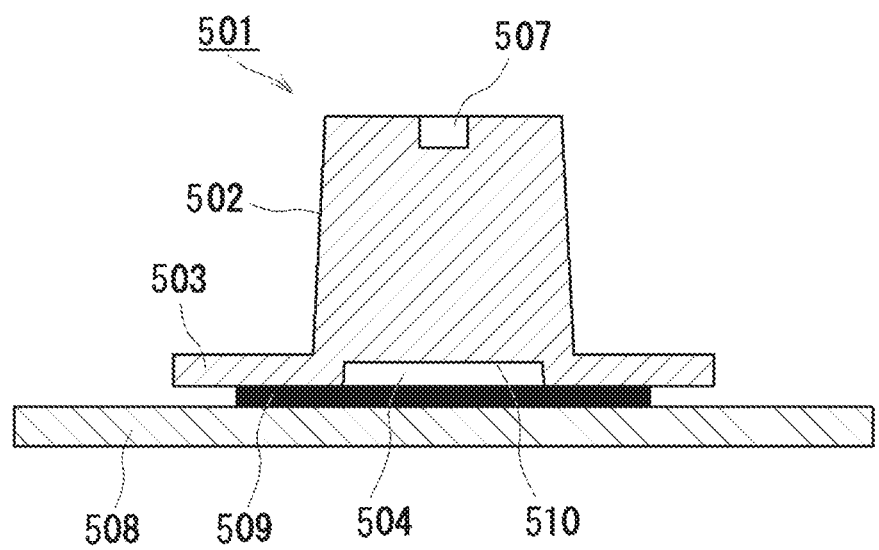
FIG. 8(b) is a schematic sectional view illustrating the state that a spin welding component 401 according to Embodiment 5 is mounted on a base member 408.

A spin welding component 501 according to Embodiment 5 of the invention is described with reference to FIG. 8(b). The like components to those of Embodiment 4 are not specifically described. This spin welding component 5 has an opening 501 of reduced volume. The configuration of Embodiment 5 has the similar functions and advantageous effects to those of Embodiment 4. Additionally, the limited volume of the opening 501 has the effect of pressing the molten resin downward during thermal welding.

Figure 9:
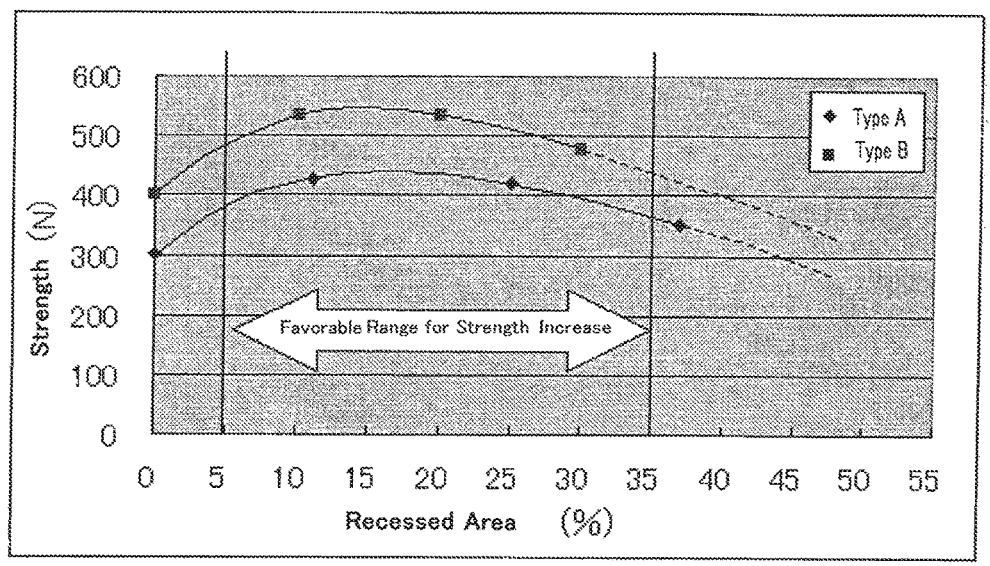
FIG. 9 is a graph showing a relationship between the recessed area and the strength in the case where spin welding components as Examples of the invention are thermally welded to a base member.

FIG. 9 is a graph showing the relationship of the strength to the concave area of the opening 4, 104, 204, 401 or 501. The concave area (%) herein denotes an area ratio in percentage of the area of the bottom face of the opening 4, 104, 204, 401 or 501 (cavity) to the area of the bottom face of the spin welding component 1, 101, 201, 401 or 501 (area of the ring shape, i.e., the bottom area where the molten resin is present). The entire diameter of the spin welding component 1, 101, 201, 401 or 501 is in the range of 20 mm to 40 mm. Type A shows configurations with an opening, and type B shows configurations without an opening in the bottom face. The concave area of 5 to 35% of the welding area is likely to increase the strength. The welding strength is increased to about 1.5 times at most.

The rotation speed of the spin welding component 1, 101, 201, 301, 401 or 501 may be about 2500 rpm. The rotation speed, however, depends on the material of the resin and the configuration of the spin welding component. The rotation speed is accordingly not limited to this numerical value but may be selected in an adequate range.

The invention is not limited to the above embodiments but various modifications, changes and additions may be made to the embodiments without departing from the scope of the invention. Such modifications as well as their equivalents are also included in the scope of the invention.

REFERENCE SIGNS LIST 1, 101, 201 spin welding component
2, 102 shaft portion
3, 103 flange portion
4, 104 opening
110 inner ceiling
8, 108 base member
9, 109 molten resin

The invention claimed is:

1. A spin welding structure, comprising:
a spin welding component, the spin welding component comprising a main body including a resin and an opening;
a base member; and
a solidified molten resin;
wherein:
the main body comprises a shaft portion, and the opening is in a concave shape to define an inner cavity of the shaft portion provided at center of a bottom of the main body;
the opening is adapted to receive the molten resin of the spin welding component or a molten resin of a welding resin material provided on a bottom face of the main body;
the solidified molten resin is a solidified molten resin of the spin welding component or is a solidified molten resin of the welding resin material; and
the solidified molten resin bonds the spin welding component to the base member.

2. The spin welding structure according to claim 1, wherein the main body has a flange portion integrally provided with the shaft portion.

3. A spin welding method to obtain the spin welding structure according to claim 1, comprising:
rotating the spin welding component that is in close contact with a base member, and that comprises a main body including a resin and an opening;
wherein the main body comprises a shaft portion, and the opening is in a concave shape to define an inner cavity of the shaft portion provided at center of a bottom of the main body;
melting the spin welding component or a welding resin material provided on a bottom face of the main body by frictional force between the base member and the spin welding component caused by the rotating;
causing molten resin of the spin welding component or the welding resin material to flow into the opening by the rotating; and
solidifying the molten resin flowing into the opening to weld the spin welding component with the base member.

4. The spin welding structure according to claim 1, wherein an area ratio of the area of the bottom face of the opening to the area of the bottom face of the spin welding component is 5-35%.

5. A spin welding component, comprising a main body, wherein:
the main body is a resin, and the main body comprises a shaft portion;
the shaft portion comprises a bottom surface for spin welding, and a recessed cavity extending inward from the bottom surface;
the recessed cavity is disposed at the center of the bottom surface;
the recessed cavity is void; and
the recessed cavity is adapted to receive a molten resin that flows toward the center of the bottom surface.

6. The spin welding component according to claim 5, further comprising a welding resin film disposed on the bottom surface.

7. The spin welding component according to claim 5, wherein:
the main body further comprises a flange portion integrally formed with the shaft portion; and
the flange portion extends outwardly from the shaft portion.

8. The spin welding component according to claim 5, wherein a ratio of the area of the recessed cavity disposed on the bottom surface to the area of the bottom surface is 5-35%.

9. A method for spin welding the spin welding component of claim 5 onto a base member, the method comprising:

disposing the spin welding component in close contact with the base member;

rotating the spin welding component to melt the resin by a frictional force generated between the base member and the spin welding component, to spread a portion of the molten resin across the bottom surface, and to cause the remaining portion of the molten resin to flow into the recessed cavity; and solidifying the molten resin to bond the entire bottom surface to the base member.

10. The method according to claim 9, further comprising disposing a welding resin film on the bottom surface before disposing the spin welding component in close contact with the base member.

11. The method according to claim 9, further comprising forming the main body by integrally molding a flange portion and the shaft portion and extending outwardly the flange portion from the shaft portion.

12. The method according to claim 9, further comprising setting a ratio of the area of the recessed cavity disposed on the bottom surface to the area of the bottom surface as 5-35%.

13. A welded structure, comprising:
a spin welding component, the spin welding component comprising a main body;
a base member; and
a solidified molten resin;
wherein:
the main body is a resin, and the main body comprises a shaft portion;
the shaft portion comprises a bottom surface for spin welding, and a recessed cavity extending inward from the bottom surface;
the recessed cavity is disposed at the center of the bottom surface;
the solidified molten resin bonds the spin welding component to the base member;
the solidified molten resin is the resin of the main body;
a portion of the solidified molten resin is disposed between the bottom surface and the base member, and the remaining portion of the solidified molten resin is received in the recessed cavity; and
the solidified molten resin bonds the entire bottom surface to the base member.

14. The structure according to claim 13, wherein the spin welding component further comprises a welding resin film disposed on the bottom surface.

15. The structure according to claim 13, wherein:
the main body further comprises a flange portion integrally formed with the shaft portion; and
the flange portion extends outwardly from the shaft portion.

16. The structure according to claim 13, wherein a ratio of the area of the recessed cavity disposed on the bottom surface to the area of the bottom surface is 5-35%.

* * * * *